(12) United States Patent
Sybesma

(10) Patent No.: US 8,630,825 B1
(45) Date of Patent: Jan. 14, 2014

(54) METHOD TO DETERMINE A CONVERGENT REFLECTOR TOPOLOGY

(76) Inventor: Hilbrand Harlan-Jacob Sybesma, Plainwell, MI (US)

( * ) Notice: Subject to any disclaimer, the term of this patent is extended or adjusted under 35 U.S.C. 154(b) by 283 days.

(21) Appl. No.: 13/206,201

(22) Filed: Aug. 9, 2011

Related U.S. Application Data

(60) Provisional application No. 61/425,433, filed on Dec. 21, 2010.

(51) Int. Cl.
*G06F 17/50* (2006.01)

(52) U.S. Cl.
USPC ........ 703/2; 703/5; 703/19; 359/28; 359/240; 359/622; 359/626

(58) Field of Classification Search
USPC .............. 703/2, 5, 19; 359/28, 240, 622, 626
See application file for complete search history.

(56) References Cited

U.S. PATENT DOCUMENTS

| | | | | |
|---|---|---|---|---|
| 6,473,238 | B1 * | 10/2002 | Daniell | 359/622 |
| 6,587,276 | B2 * | 7/2003 | Daniell | 359/622 |
| 2003/0112523 | A1 * | 6/2003 | Daniell | 359/626 |
| 2005/0104075 | A1 * | 5/2005 | Evans et al. | 257/83 |
| 2006/0256415 | A1 * | 11/2006 | Holmes et al. | 359/28 |
| 2009/0147342 | A1 * | 6/2009 | Rahm et al. | 359/240 |
| 2012/0011050 | A1 * | 1/2012 | Lambert | 705/37 |
| 2012/0044694 | A1 * | 2/2012 | du Plessis | 362/290 |

* cited by examiner

*Primary Examiner* — Thai Phan
(74) *Attorney, Agent, or Firm* — McGarry Bair PC

(57) ABSTRACT

A method of determining the surface topology of a reflector for convergence of a beam incident thereupon.

18 Claims, 13 Drawing Sheets

METHOD TO DETERMINE A CONVERGENT REFLECTOR TOPOLOGY

CROSS REFERENCE

This application claims the benefit of U.S. Provisional Patent Application No. 61/425,433, filed Dec. 21, 2010, which is incorporated herein by reference in its entirety.

BACKGROUND OF THE INVENTION

Light Amplification by Stimulated Emission of Radiation (laser) provides for a spatially coherent, spatially narrow, spectrally narrow (monochromatic), low divergence beam of electromagnetic radiation. Lasers can be found in a number of modern-day applications, such as cutting tools, surgery, optical storage devices, and optical communications. A laser beam is produced by reflecting light back and forth using reflectors through an optical cavity containing a gain medium having an energy population inversion (i.e. more electrons in a relatively high energy state versus at a low energy state). The reflectors used for the reflection are typically flat, spherical, or parabolic. Additionally, once the laser beam is emitted through a partially transmitting reflector, the beam can be manipulated by optical elements such as reflectors, lenses, polarizers, optical fiber, and diffraction gratings. For some applications, such optical elements may need to be very precisely manufactured and may have a resulting high cost. Lenses, in particular may need to have a very precise shape and surface finish for some applications. The material properties of a lens, such as the index of refraction, vary with the wavelength of the laser beam. The uses of lenses to converge a beam of light may lead to various optical aberrations, including spherical and chromatic aberrations.

SUMMARY OF THE INVENTION

The invention relates to a method of determining a surface topology of a reflector comprising the steps of determining a forcing function; applying a convergence algorithm to the forcing function to determine a first set of coordinates of the surface topology; determining a first set of slopes corresponding to each of the first set of coordinates of the surface topology; fitting the slopes to a current iteration of a second set of coordinates corresponding to the first set of coordinates to generate one or more slope functions; integrating the slope functions relative to the current iteration of the second set of coordinates to determine a reflector topology function; recording the current iteration of the second set of coordinates as a previous iteration of the second set of coordinates; determining a new iteration of the second set of coordinates corresponding to the first set of coordinates from the mirror topology function and setting the new iteration of the second set of coordinates to the current iteration of the of the second set of coordinates; determining that the reflector topology function represents the surface topology of the reflector when comparing the new iteration of the second set of coordinates to the previous iteration of the second set of so that the coordinates satisfy a threshold; and repeating selected steps if comparing the current iteration of the second set of coordinates to the previous iteration of the second set of coordinates does not satisfy a threshold. In the process, the first set of coordinates are orthogonal to the second set of coordinates.

In another aspect, the method can be applied to determine a surface topology of a reflector to produce beam convergence.

DESCRIPTION OF AN EMBODIMENT OF THE INVENTION

The present invention relates generally to a method of determining the topology of reflectors that provide convergence of light that reflects upon it. More specifically, the topology of a convergent reflector is determined by using an iterative algorithm for converging upon the desired topology. The embodiments described herein can be applied to any convergent reflector design.

Although the convergent reflector designs are described in the context of optics and more particularly laser cavities, the convergent reflector designs can apply to any type of reflector used for reflecting any type of radiation or matter.

Figure 1:
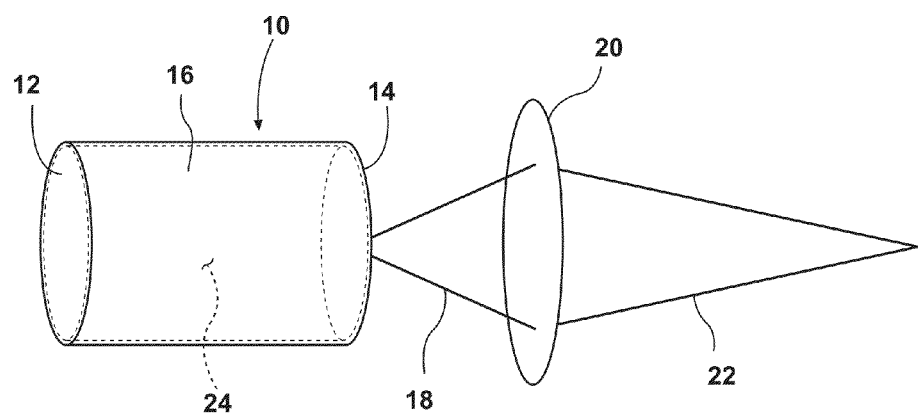
FIG. 1 is a schematic diagram of a laser device on which an embodiment of the invention can be applied.

FIG. 1 shows a schematic diagram of a laser device 10 for producing a spatially coherent, spatially narrow, spectrally narrow (monochromatic), low divergence laser beam 18 of electromagnetic radiation as known in the prior art. A laser device 10 comprises an optical cavity 16 containing a gain medium 24 with a total reflectance reflector 12 on one end and a partial reflectance reflector 14 on the other end. The laser beam 18 is emitted through the partial reflectance reflector 14. A lens 20 may be used to focus the laser beam 18 into a focused beam 22.

The laser device 10 can be any one of various types, including, but not limited to solid state, gas, excimer, and semiconductor lasers. These various types of lasers differ in the type of gain medium 24 contained within the optical cavity, as well as, the methods of delivering power to the gain medium. For example, the gain medium in a gas laser contains a gas such as a mix of Helium and Neon and a solid state laser may have a gain medium comprising Neodymium-doped yttrium aluminum garnet ($Nd:YAl_5O_{12}$ or Nd:YAG). To produce laser radiation, the gain medium 24 needs to be pumped, or supplied with energy to achieve a state called a population inversion, where there are more electrons at a higher energy level than a lower energy level. As electrons lose energy from the higher energy level to the lower energy level, the lost energy is emitted as a photon. If some of the light produced in the optical cavity is fed back into the cavity, by reflecting the light off of both the total reflectance reflector 12 and the partial reflectance reflector 14, stimulated emission and coherence of the light is achieved. Therefore the reflectors 12 and 14 are critical to the efficient functioning of the laser device 10.

The total reflectance reflector 12 reflects substantially all the light that is incident upon it. The partial reflectance reflector 14 reflects most of the light that is incident upon it and allows some of the light to transmit through the reflector 14. For example, a partial reflectance reflector 14 may allow 3% of light to pass and 97% reflectance. Reflectors 12 and 14 enclosing the optical cavity 16 in the current art are typically flat, parabolic, or spherical shaped. Such conventional reflectors may result in reflections that do not converge the light. Reflectors 12 and 14 that converge the light rather than diverge the light within the optical cavity 16 may provide the advantage of greater lasing efficiency. Additionally, it is important to note that the use of convergent reflectors may pose the advantage of not requiring a lens 20 outside of the laser device 10 to shape the laser beam 18 emitted from the laser device 10. Not requiring an external lens 20 or other optical elements can present a cost, form factor, and performance advantage in many systems and applications.

Figure 2A:
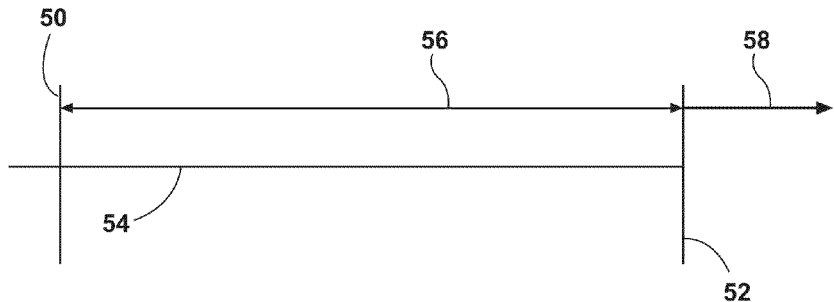
FIG. 2A is a ray tracing diagram with a flat beam pattern applied to a reflector design known in the prior art.
Figure 2B:
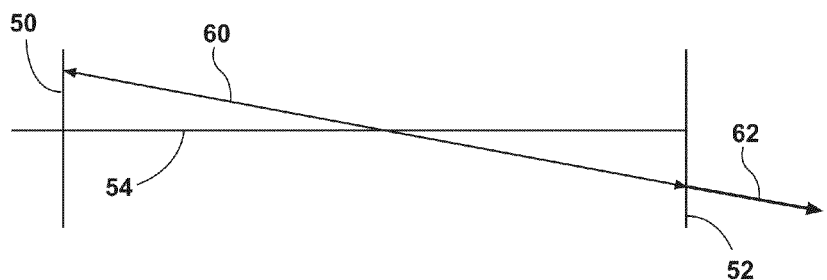
FIG. 2B is a ray tracing diagram with a cross beam pattern applied to a reflector design known in the prior art.
Figure 2C:
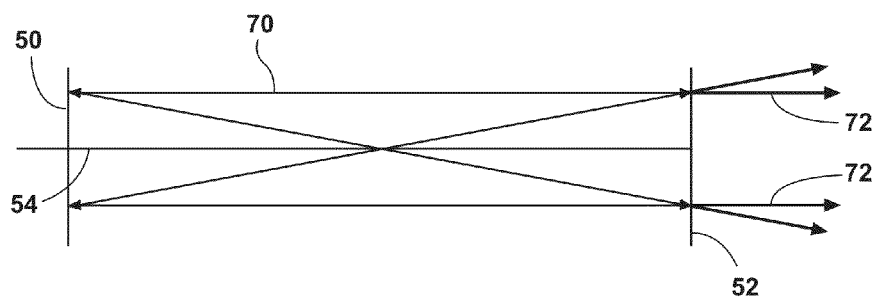
FIG. 2C is a ray tracing diagram with a conjugate beam pattern applied to the reflector design known in the prior art.

FIGS. 2A, 2B, and 2C are ray tracing diagrams of flat, cross, and conjugate beam patterns, respectively with conventional reflector design for both the total reflectance reflector 50 and the partial reflectance reflector 52. FIG. 2A shows that with a flat beam 56, which may reflect back and forth multiple times between the two reflectors 50 and 52, the start and end points are at the same distance away from the optical axis 54 and is emitted through the partial reflectance reflector 52 as beam 58. With the cross beam pattern of FIG. 2B, the same phenomenon arises, where the cross beam 60 starts and ends at the same distance away from the optical axis 54 after one or more reflections and is emitted through the partial reflectance reflector 52 as beam 62. Again the beams 72 emitted through the partial reflectance reflector 52 are at the same distance away from the optical axis 54 as where the beam 70 started in the case of conjugate beam reflections of FIG. 2C. Therefore, for conventional reflector designs, there is no convergence in the beam, since the start locations and the end locations of the beams are the same distance away from the optical axis 54 with symmetry around the optical axis 54. In other words, with conventional reflector designs, the optical beam, if started at a particular distance away from the optical axis 54, do not converge upon a point that is a different distance away from the optical axis 54 after multiple reflections by design.

With conventional reflectors, such as flat, spherical, and parabolic shapes, the emitted beam from the partially transmitting reflector is ideally the same distance away from the optical axis as where the optical beam started. However, there may be non-idealities such as surface imperfections on the reflector or alignment errors of the reflectors which may induce divergence of the beam after multiple reflections, where the optical beam is emitted at a distance from the optical axis that is greater than the distance where the optical beam started. As a result, in practical implementations of known reflector topologies 50 and 52, the electromagnetic radiation emitted after multiple reflections between the two reflectors may result in divergence of the optical beam.

Figure 3A:
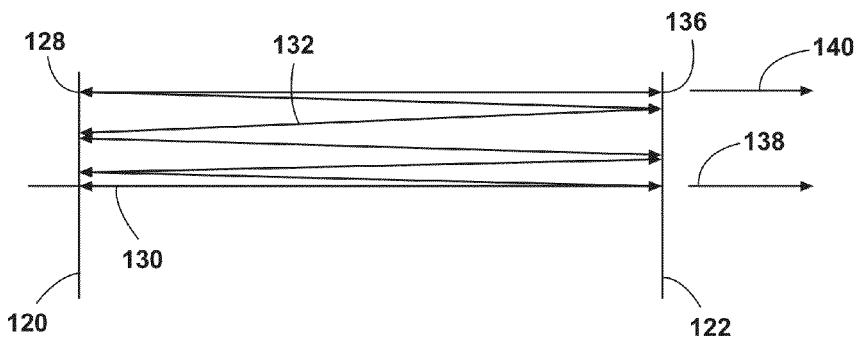
FIG. 3A is a ray tracing diagram with a flat beam pattern applied to a reflector design according to the invention.
Figure 3B:
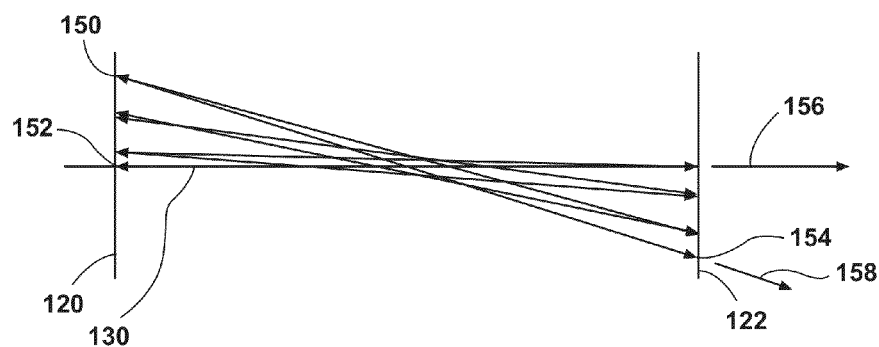
FIG. 3B is a ray tracing diagram with a cross beam pattern applied to the reflector design of FIG. 3A.
Figure 3C:
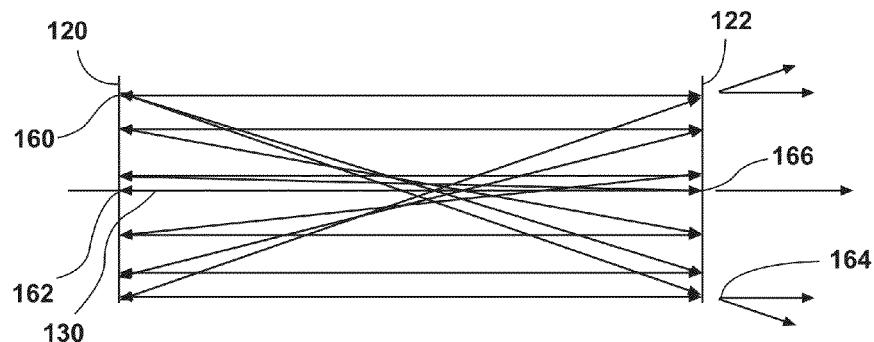
FIG. 3C is a ray tracing diagram with a conjugate beam pattern applied to the reflector design of FIGS. 3A and 3B.

In contrast to the non-converging reflectors of 2A-C, a convergent reflector behavior is shown in FIGS. 3A-C, where a light beam's end distance relative to the optical axis 130 is less than the start position relative to the optical axis 130. Therefore, the light converges to one or more points.

FIGS. 3A, 3B, and 3C are ray tracing diagrams of flat, cross, and conjugate beam patterns, respectively of a convergent reflector design for both the total reflectance reflector 120 and the partial reflectance reflector 122. FIG. 3A shows that with a flat beam 136, which may reflect back and forth multiple times, such as at 128 between the two reflectors 120 and 122, as multiple reflected beams, such as beam 132, the start point may be at the start beam 136 and the end beam may be at the optical axis 130 and emitted through the partially reflecting reflector 122 as beam 138 and 140. As a result the beam converges to a point relative to the optical axis 130 on the output of the optical cavity that is different from the start point relative to the optical axis 130. With the cross beam pattern of FIG. 3B, the same phenomenon as FIG. 3A arises, where the cross beam starts and ends at different points relative to the optical axis 130. In the case of the cross beam for example a beam that starts at point 154 may converge at two points 154 and at the optical axis 130 and emitted as beams 156 and 158 through the partially transmitting reflector 122 after multiple reflections. Again the beams 164 and 166 emitted from the partial reflectance reflector 122 are at a different distance away from the optical axis 130 compared to where the beam 160 started in the case of conjugate beam reflections of FIG. 3C. Therefore, for convergent reflector designs, there is convergence in the multiple reflected beams, since the start locations and the end locations of the beams are different distances away from the optical axis 130. In other words, with convergent reflector design, the optical beam if started at a particular distance away from the optical axis 130 may converge upon a point that is a different distance away from the optical axis 130 after multiple reflections by design.

It is seen by comparing the ray tracing diagrams of FIGS. 2A, 2B, and 2C to FIGS. 3A, 3B, and 3C, the beams can be converged within the optical cavity by a series of reflections and can be emitted from the optical cavity in a predefined pattern without the use of optical elements outside of the optical cavity. A method is disclosed herein that can be used to derive the topology of the reflectors. In particular the method can be used to derive reflector topologies that result in convergence of a laser beam. Convergence within the optical cavity, instead of requiring optical elements outside of the optical cavity can pose several advantages including reduced cost, reduced form factor and greater efficiency and reliability.

Figure 4:
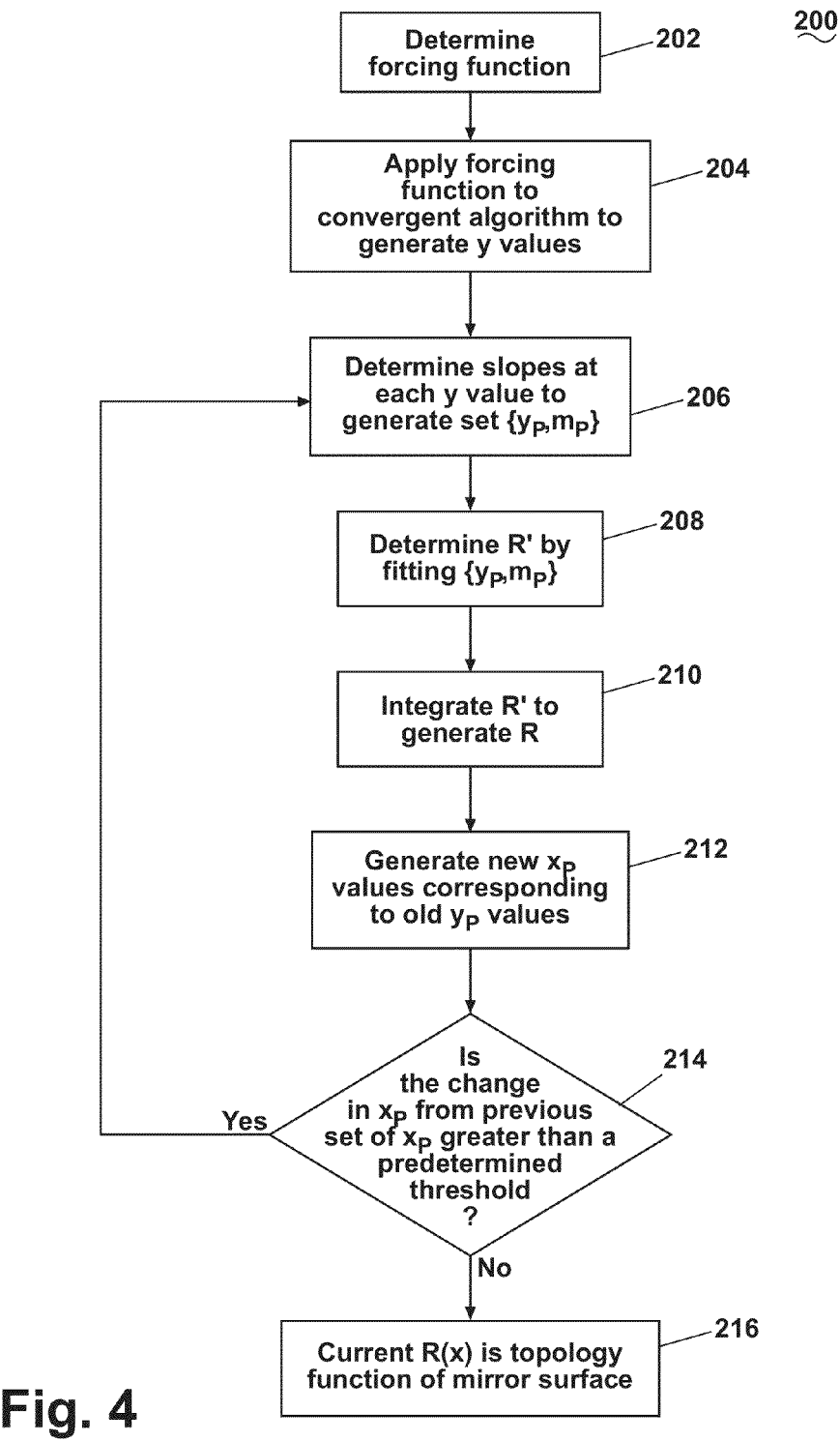
FIG. 4 is a flow diagram illustrating a method of determining a convergent reflector topology.

FIG. 4 is a flow diagram illustrating the method of determining the surface topology of a reflector surface 200. First a forcing function, f(x), is determined at 202. The choice of forcing function is very important in the determination of the surface topology. To have a convergent design, the forcing function, f(x), must be one that has areas that do not converge in the x+jy space. This will be described in greater detail in conjunction with FIGS. 8, 9, and 10. Once a forcing function is determined at 202, the forcing function is applied to a convergent algorithm to generate y values of the reflector topology at 204. The convergent algorithm can be any known algorithm for iterative determination of roots of a function. For example one such convergent algorithm can be the Newton-Raphson algorithm described as:

$$x_{n+1} = x_n - \frac{f(x)}{f'(x)}$$

where, $x_{n+1}$ is the approximation of the value of a root of a function derived upon iterating the convergence algorithm one time beyond the approximation $x_n$, f'(x) is the first derivative of the forcing function f(x), and n is a real integer. Although the Newton-Raphson algorithm is used throughout this specification, any known convergence algorithm may be used.

The set of x values, $x_P$, generated by subjecting the forcing function f(x) to the convergent algorithm is the set of y-values in the x-y space in which the reflector topology is defined. In other words, the numerical values of $\{x_1, x_2, \ldots, x_P\}$ in the x+jy space of the forcing function are numerically equivalent to $y_1, y_2, \ldots, y_P$ in the x-y space in which the surface topology of two reflector surfaces are defined as a set of points with p members. The reflector surface is defined as set of points in the x, y space, with p members. For purposes of discussion, the complete set of x values, $\{x_1, x_2, \ldots, x_P\}$ in the x-y reflector topology space is defined as $x_P$. Similarly, the complete set of y values, $\{y_1, y_2, \ldots, y_P\}$ in the x-y reflector topology space is defined as $y_P$. Therefore the reflector surface can be defined as a set of paired points $\{x_P, y_P\}$ with p members.

At 204, the x-values, $x_P$, of the surface topology are known as a result of the size of the optical cavity. In other words, if the optical cavity has a length of λ, then the x-values may be either −λ/2 or λ/2 on the initial iteration. At 206, the slope at each $y_P$ is determined to generate a set of y values and slopes $\{y_P, m_P\}$, where $m_P$ is a set of slope values, $\{m_i, m_2, \ldots, m_P\}$ corresponding to each of the x-values, $x_P$ and y-values, $y_P$. The slope is calculated at any point, i, in the set of $y_P$, by considering the values of $x_i$, $y_i$, $x_{i-1}$, $x_{i+1}$, and $y_{i+1}$. In other words, the slope at any point i, is a function of the coordinates of that point $(x_i, y_i)$, as well as the coordinates of the previous $(x_{i-1}, y_{i-1})$ and subsequent $(x_{i+1}, y_{i+1})$ points in the set $\{x_P, y_P\}$. $m_i$ is a real scalar that must satisfy a condition where a beam impingent on point $(x_i, y_i)$ with a trajectory defined by the direction from $(x_{i-1}, y_{i-1})$ to $(x_i, y_i)$ must be reflected to the point $(x_{i+1}, y_{i+1})$. The slope at any point $(x_i, y_i)$ can be determined as:

$$m_i = \tan\left[\frac{1}{2}\left(\tan^{-1}\left(\frac{y_{i+1} - y_i}{x_{i+1} - x_i}\right) - \tan^{-1}\left(\frac{y_i - y_{i-1}}{x_i - x_{i-1}}\right)\right) + \frac{\pi}{2}\right]$$

It should be noted that the derivation of the slope is just one known derivation. Any known algorithm or method may be used to determine the slope, based on the reflections desired at that point $(x_i, y_i)$.

Next, at 208, R'(x) or the first derivative of the surface topology is determined by fitting to the set of y-values and slopes, $\{y_P, m_P\}$. The fitting may be by any known method such as linear regression and least squares fit. Next R'(x) is integrated to generate the surface topology R(x) at 210 as:

$$R(x) = \int R'(x) * dx + K$$

where K is a constant of integration. If the system is centered at x=0, meaning the two reflectors are equidistant from the y-axis, then K=0.

Using the new R(x) function, new values of x are generated, $x_P$, corresponding to the y-values, $y_P$, at 212. Next it is determined if the current iteration of the set $x_P$ is different from the previous set of $x_P$ by a predetermined value at 214. If it is, then R(x) and therefore $\{x_P, y_P\}$ of the reflector topology have not converged and therefore the method loops back to 206, where the new x-values, $x_P$, determined at 212 are used to determine new values of slope, $m_P$, at each y-value at 206. Once the y-values are determined based on the forcing function f(x) at 204, the set of y-values do not change. Therefore, at each iteration, only the x-values change based on a revised set of slopes, $m_P$, with the fixed set of y-values, $y_P$. After a sufficient number of iterations with the feedback loop to 206, the set of x-values, $x_P$, eventually converge and the change in $x_P$ from a previous $x_P$ drops to less than a predetermined threshold at 214. At this point, R(x), and the resulting $\{x_P, R(x)\}$ or $\{x_P, y_P\}$ defines the reflector surface topology.

The sequence of steps depicted is for illustrative purposes only, and is not meant to limit the method 200 in any way as it is understood that the steps may proceed in a different logical or sequential order and different, additional, overlapping, or intervening steps may be included without detracting from the invention.

In this algorithm 200, the more data points that are used, p, the more precise the reflector surface topology determination will be. Additionally, more iterations at 206 can result in greater precision and accuracy of the algorithm. The number of iterations can be increased by setting a lower predetermined threshold for the change in $x_P$.

Due to the volume of calculations required in this method 200, it is envisioned that the method 200 is executed on a computer with electronic memory running a mathematical software or with a software dedicated to the execution of this algorithm. Examples of commercial software on which the method 200 may be implemented include Microsoft Excel®, Maplesoft Maple®, or Mathworks Matlab®.

Figure 5:
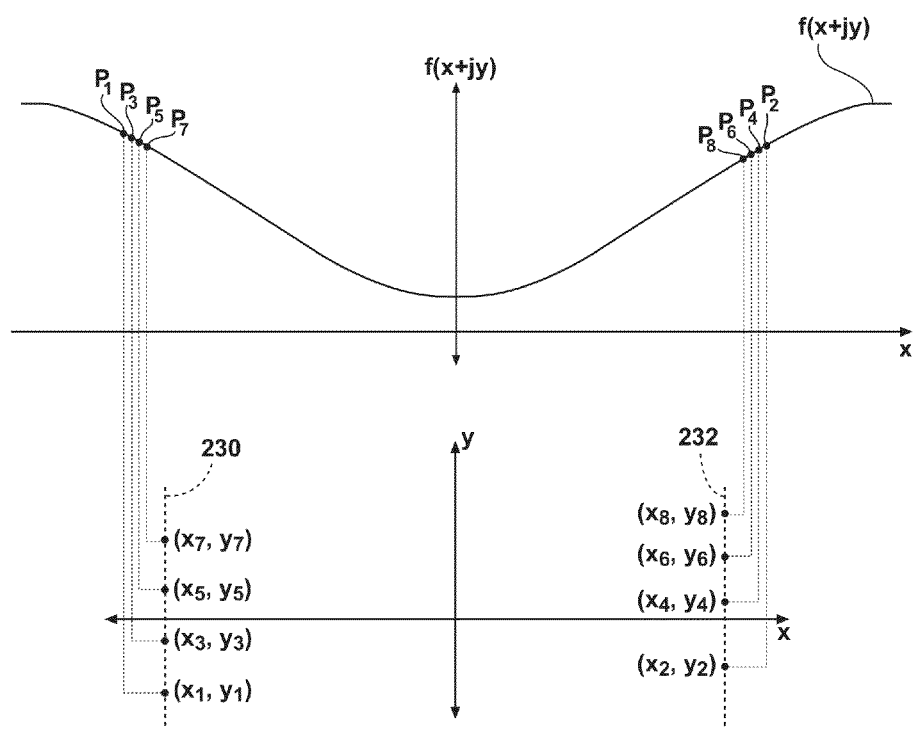
FIG. 5 is an example of a forcing function that provides a convergent reflector design.
Figure 6:
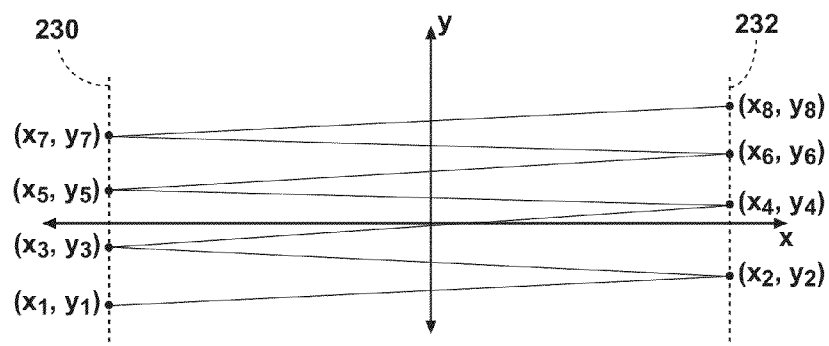
FIG. 6 shows a first iteration of a reflector topology based upon the method of FIG. 4.
Figure 7:
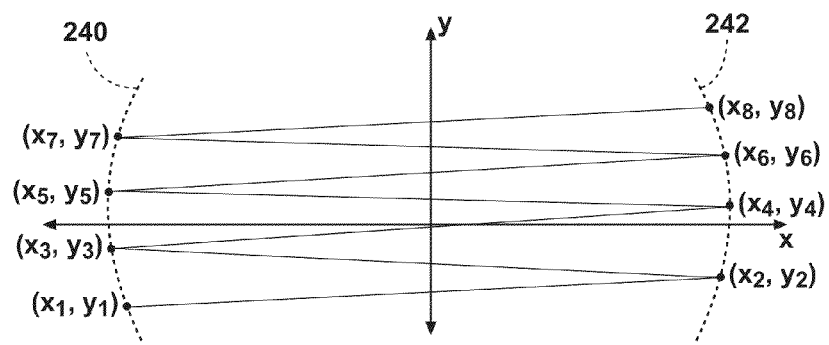
FIG. 7 shows a subsequent iteration of a reflector topology based upon the method of FIG. 4.

The use of the method of determining a surface topology of a reflector surface 200 will be better understood by example in conjunction with FIGS. 5, 6, and 7. The top graph of FIG. 5 shows a forcing function, represented as f(x+jy) in a complex space (x+jy, f(x+jy)). To determine a convergent reflector design, f(x+jy) must have areas in the x+jy space where f(x+jy) applied to a convergent algorithm does not converge to a root of f(x+jy). In this example, P1, representing $(x_1, jy_1, f_1(x_1+jy_1))$ is a point within a non-convergent area and as a result in the non-convergent area in the x+jy space is applied to the convergence algorithm. This generates a series of points, $P_2, P_3, P_4, P_5, P_6, P_7$, and $P_8$ in the x+jy complex space.

Each of the x values of each of the points are set as the y values in the real x–R(x) space of the reflector topology function. For simplicity, the method is depicted with only 8 points, or 4 points on each reflector. In the first iteration the left reflector topology is depicted as 230 and the right reflector topology is represented as 232. As depicted in FIG. 6, in the first iteration, the reflector topology is flat, because the x values are one of two values for each reflector 230 and 232 on either side. Next the slopes at each of the (x, y) points is determined at 206 so that a reflection to the next (x, y) point is achieved along the reflection paths as depicted in FIG. 6. For example, at a certain slope at ($x_2$, $y_2$), the beam incident upon that point from point ($x_1$, $y_1$) will reflect from the surface at point ($x_2$, $y_2$) and reach point ($x_3$, $y_3$). In effect, slope at that point, m2 is determined such that the beam reflects from ($x_1$, $y_1$) to ($x_2$, $y_2$) and then to ($x_3$, $y_3$).

Once the slope at each of the points, p, is determined, the complete set of x-values and slopes, $\{X_P, m_P\}$ are fit to one of two different fitting functions $R_1'(x)$ and $R_2'(x)$ for the reflectors 230 and 232, respectively. Each of the fitting functions $R_1'(x)$ and $R_2'(x)$ are then integrated to derive $R_1(x)$ and $R_2(x)$, respectively. New values of X, $x_P$ are generated from $R_1(x)$ and $R_2(x)$ at each value of $y_P$. FIG. 7 shows the graphical representation of $\{x_P, y_P\}$ with the new set of $X_P$ values, where the $X_P$ values are different from the $X_P$ values in FIG. 6, and the $y_P$ values are the same.

It is then determined if the $x_P$ have converged by comparing the new $x_P$ values to the old $x_P$ values. There are many ways to determine if the functions have converged, including determining an error value of the average square root of the square of the difference by:

$$\delta = \frac{1}{p}\sum_j^p \sqrt{(x_j^{new} - x_j^{prev})^2},$$

where δ is error value, p is the total number of points, j is an index, $x_j^{new}$ is the new x value at the jth index, and $x_j^{prev}$ is the previous x value at the jth index from the previous iteration.

This error value may be compared to a predetermined threshold to determine if the set of $x_P$ have converged. As an alternative, the error value, δ, may be normalized by the mean of the set of $x_P$, to determine a percentage error for comparison to a predetermined threshold of percentage error. For example the percentage error threshold may be 0.1%, meaning if the difference between the new $x_P$ and previous $x_P$ is less than 0.1%, then the functions $R_1(x)$ and $R_2(x)$ are deemed to be converged.

If it is determined that $x_P$ has converged then the topology of FIG. 7 represents the final topology of the reflectors 240 and 242. If however, it is determined at 214 that the values of $x_P$ have not converged, then the method repeats the previous steps starting from determining the slopes at each y-value, $y_P$, using the new $x_P$ values at 206.

The reflector topologies determined by the method 200 can be used to fabricate reflectors 12 and 14 of the laser device 10 by any known method including, but not limited to machining or three-dimensional (3D) printing. The reflectors with the determined topologies therefore are an improvement over currently used reflectors as the new reflectors can result in greater lasing efficiency and can produce laser emissions with beam patterns that can be formed with a reduced number of, and in some cases no additional, optical elements outside of the laser device 10.

Figure 8:
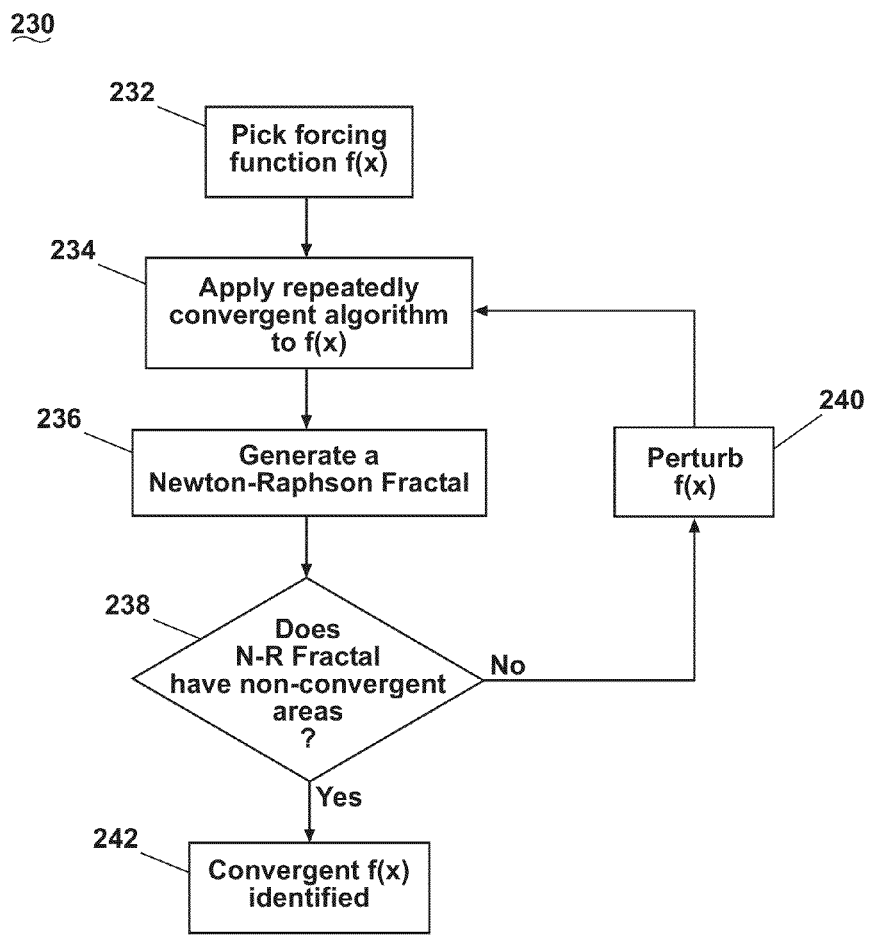
FIG. 8 is a flow diagram for determining a forcing function that will generate a convergent reflector topology when applied to the method of FIG. 4.

From the discussion above, it is clear that the choice of the forcing function is important in determining a topology of the reflector that leads to convergence of light reflecting therefrom. FIG. 8 is a flow diagram showing a method of determining an appropriate forcing function 230 that will produce a convergent reflector design when applied to the method for determining a reflector topology 200 of FIG. 4. In essence the required forcing function is one that produces areas in the x+jy space where the function does not converge when applied to a convergent algorithm. The method starts by picking a forcing function at 232. The forcing function must be a third or higher order polynomial function and have at least one inflection point. An inflection point for this purpose is a point where the second derivative of the function is zero and has different signs on either side of the inflection point. The forcing function is more ideally a third order or higher polynomial. Such third and higher order polynomials are likely to produce forcing functions that are non-convergent over an area in the x+jy space. The next step is to repeatedly apply a convergent algorithm to f(x) at 234. The convergent algorithm can be any known convergent algorithm, including the Newton-Raphson convergent algorithm as discussed above. The convergent algorithm is applied repeatedly by using a computer such as a micro-computer and the data points in the x+jy space are stored in an electronic memory of the computer. The convergent algorithm is applied to various portions of the x+jy space to test the convergence in all location. That means that for a function there are as many convergent areas as there are roots for a function. For example a fourth order polynomial function may have four roots, so in that case there may be four sets of areas that converge to four different roots. The areas associated with each of the roots can be represented as such on a plot of the x+jy space. The (x+jy, f(x+jy)) data is plotted as a Newton-Raphson fractal at 236. It is then determined if the Newton-Raphson fractal has any non-convergent areas at 238. If there are no non-convergent areas in the Newton-Raphson fractal, then the function is perturbed and the method loops back to 234 to apply the new function repeatedly to the convergent algorithm. If it is found that the function f(x) does have at least one non-convergent area at 238 then the forcing function, f(x) can be used to generate a convergent reflector topology and therefore an appropriate forcing function is identified at 242.

An example of a non-convergent forcing function is:

$$f(x) = x^4 + 112$$

Applying the above function to the method 200 of FIG. 4 will generate a non-convergent reflector topology.

An example of a convergent surface topology function is:

$$f(x) = -x^4 + 4.29x^2 + 5.62$$

Applying the above function to the method 200 of FIG. 4 will generate a convergent reflector topology. Although in this example, f(x) is a fourth order polynomial, f(x) can be a polynomial function of any order, as well as, a sinusoidal, exponential, logarithmic, or any variety of known functions.

The perturbation of f(x) at 240 may in most cases be by changing the f(x)-offset of f(x). For example, consider a general function of the form:

$$f(x) = \sum_q^Q K_q * x^q \bigg|_{Q \geq 3}$$

where q and Q are integers and $K_q$ are real numbers.

If the Newton-Raphson fractal generated from this function f(x) does not indicate non-convergent areas at 238, then the function may be perturbed by incrementing the value of $K_0$ by a predetermined amount. This has the effect of increasing the f(x)-offset of the function and for many polynomial functions, such an offset may lead to a new function with a non-convergent area in the x+jy space as indicated by areas of non-convergence in the associated Newton-Raphson fractal. Such functions can then be used in the method 200 of FIG. 4 to determine a convergent reflector topology.

As a more specific example, consider a forcing function:

$$f(x)=ax^b+cx^d+e,$$

where b and d are integers and a, c, and e are real numbers.

If the Newton-Raphson fractal generated from this function f(x) does not indicate non-convergent areas at 238, then the function may be perturbed by incrementing the value of e by a predetermined amount. This has the effect of increasing the f(x)-offset of the function and for many polynomial functions, such an offset may lead to a new function with a non-convergent area in the x+jy space as indicated by areas of non-convergence in the associated Newton-Raphson fractal. Such functions can then be used in the method 200 of FIG. 4 to determine a convergent reflector topology.

Figure 9:
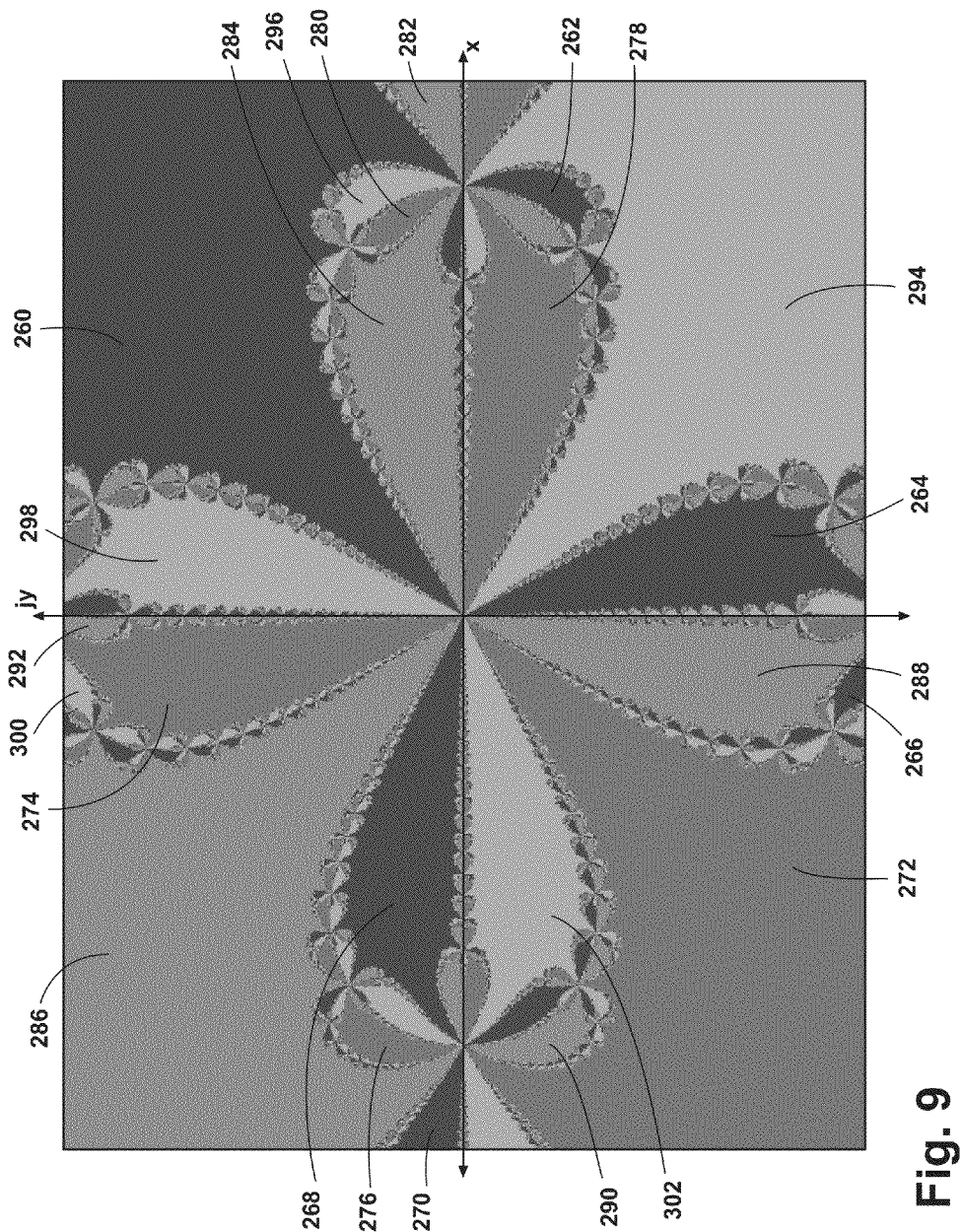
FIG. 9 is a fractal diagram of a forcing function that does not have non-convergent areas and will not generate a convergent reflector design when applied to the method of FIG. 4.

FIG. 9 shows an example of a Newton-Raphson fractal without areas of non-convergence. As a result the function of this fractal is not an appropriate forcing function to generate a convergent reflector topology when applied to the method of FIG. 4. Each of the areas that converge to a particular root can be represented by a color (i.e., in the drawings, differences in "color" can be generally shown by differing grayscale shades). Each root has a different color associated with it. Therefore areas represented by 260, 262, 264, 266, 268, and 270 converge to a first root, while areas 272, 274, 276, 278, and 280 to a second root, 282, 284, 286, 288, 290, and 292 converge to a third root, and finally, areas 294, 296, 298, and 300 converge to a fourth root. The interfaces between two different areas corresponding to two different roots is infinitely small and cannot be construed an area in the x+jy space. In other words, there are no areas in the x+jy space that do not converge to one of the four roots of the function f(x). As a result, this function is not a forcing function that will produce a convergent reflector topology.

Figure 10:
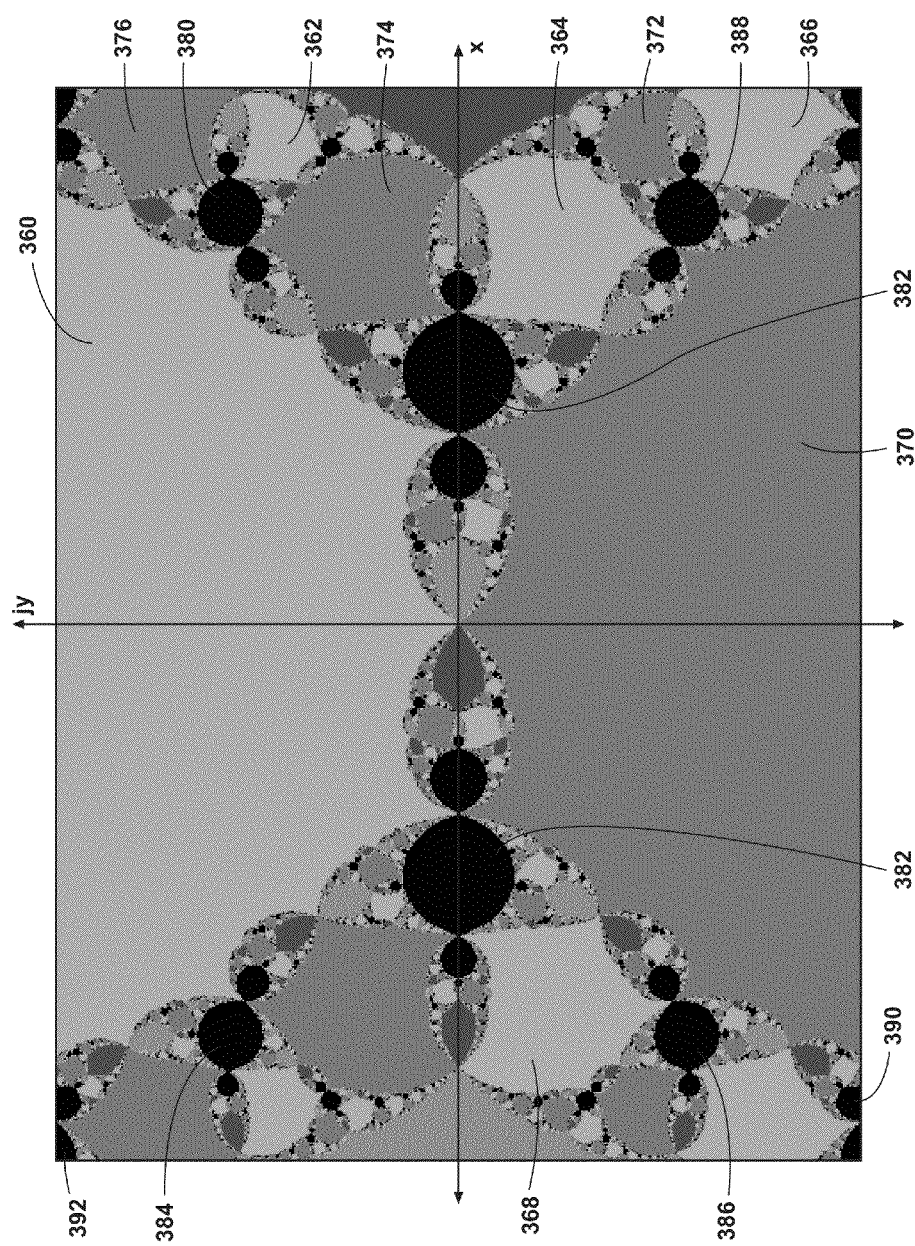
FIG. 10 is a fractal diagram of a forcing function determined according to the method of FIG. 8 such that when the forcing function is applied to the method of FIG. 4, a convergent reflector topology results.

Unlike FIG. 9, FIG. 10 shows an example of a Newton-Raphson fractal of a function with areas of non-convergence. The areas defined by 360, 362, 364, 366, 368 are areas where all points converge to a first root when any point in those areas are applied to a convergence algorithm, such as a Newton-Raphson convergence algorithm. In other words, any point applied to a convergent algorithm in these areas will produce another point that converges to the same root and therefore that point is in an area designated by the same color as the areas 360, 362, 364, 366, and 368. The areas 370, 372, 374, 376 similarly contain points that converge to a second root when applied to a convergent algorithm. Points in the areas 380, 382, 384, 386, 388, 390, and 392 do not converge to a root. Therefore there are areas that do not converge to a root for this function. As a result, this function can be used as a forcing function in the method for determining a convergent reflector topology of FIG. 4.

Figure 11B:
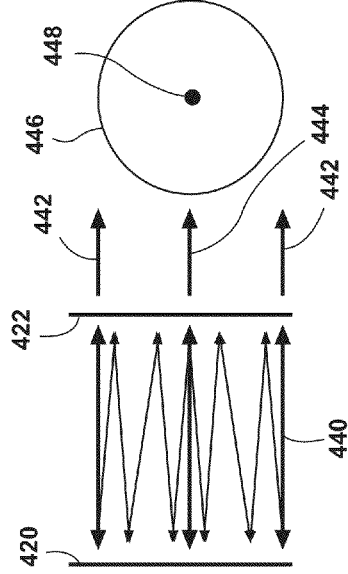
FIG. 11B is a schematic representation of another laser beam pattern that can be generated using reflectors designed using the method described in FIG. 4.
Figure 11D:
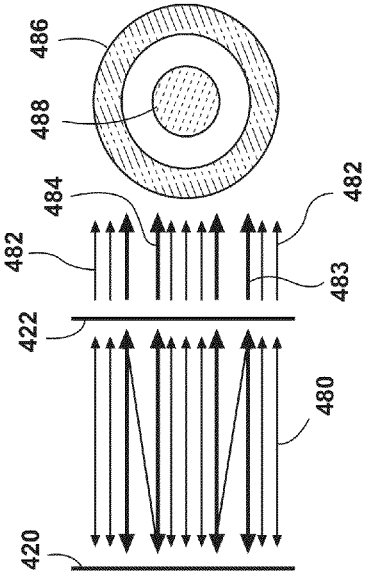
FIG. 11D is a schematic representation of yet another laser beam pattern that can be generated using reflectors designed using the method described in FIG. 4.
Figure 11A:
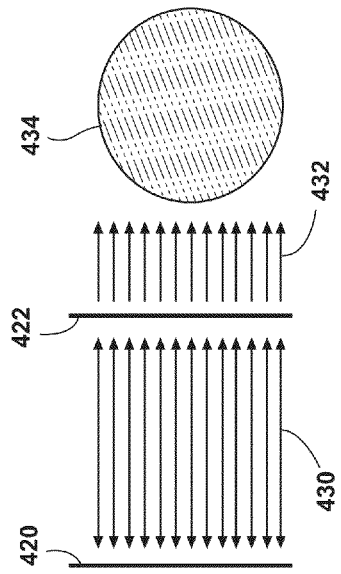
FIG. 11A is a schematic representation of a laser beam pattern that can be generated using known reflectors in the prior art.
Figure 11C:
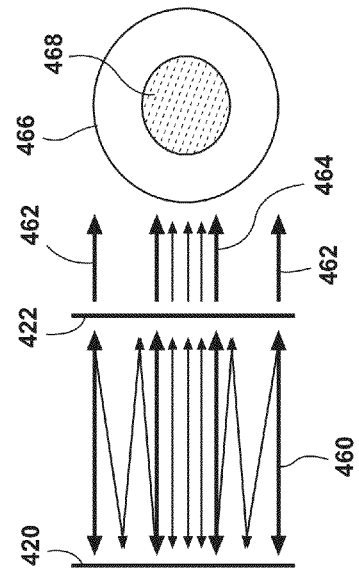
FIG. 11C is a schematic representation of yet another laser beam pattern that can be generated using reflectors designed using the method described in FIG. 4.

FIGS. 11A-D show examples of various laser emissions. FIG. 11A shows a radiation emission using reflector topologies known in the prior art. The radiation emission 432 from the partial reflectance reflector 422 is distributed over the full surface of the reflector generating pattern 434. A convergence of the radiation to specific regions is not observed in this prior art reflector design. On the other hand FIGS. 11B-D show examples of convergent laser emissions. Spatial convergence of the emitted radiation does not have to be at the optical axis, but can be anywhere along the topography of the reflector. Additionally, based on the forcing function that has been chosen, there may be multiple convergence points. FIG. 11B shows a radiation of emission through the partial reflectance reflector 422 with two convergent points 442 and 444. As a result the emission pattern has an outside ring convergence 446 with an internal point convergence 448. FIG. 11C shows another convergent emission pattern with an outside ring 466 and inside area of convergence 468 resulting from emissions 462 and 464 through the partial reflectance reflector 422. FIG. 11D illustrates yet another convergent emission pattern where there is an annular region 486 of convergence with a round area 488 of convergence inside of the annular region 486 resulting from emissions defined by 482, 483, and 484.

All of the radiation patterns in FIGS. 11B-D have at least two points of convergence. In some cases, it may be advantageous to have a single point of convergence, such as a single center point. In such a case, one may design reflectors 420 and 422 to produce a radiation pattern as depicted in any of FIGS. 11B-D and then modify portions of the reflectors 420 and 422, such that the rays 442, 462, 482, and 483 that are not emitted from the origin point are reflected back in a manner so that they emit as a ray from the origin point.

Figure 12A:
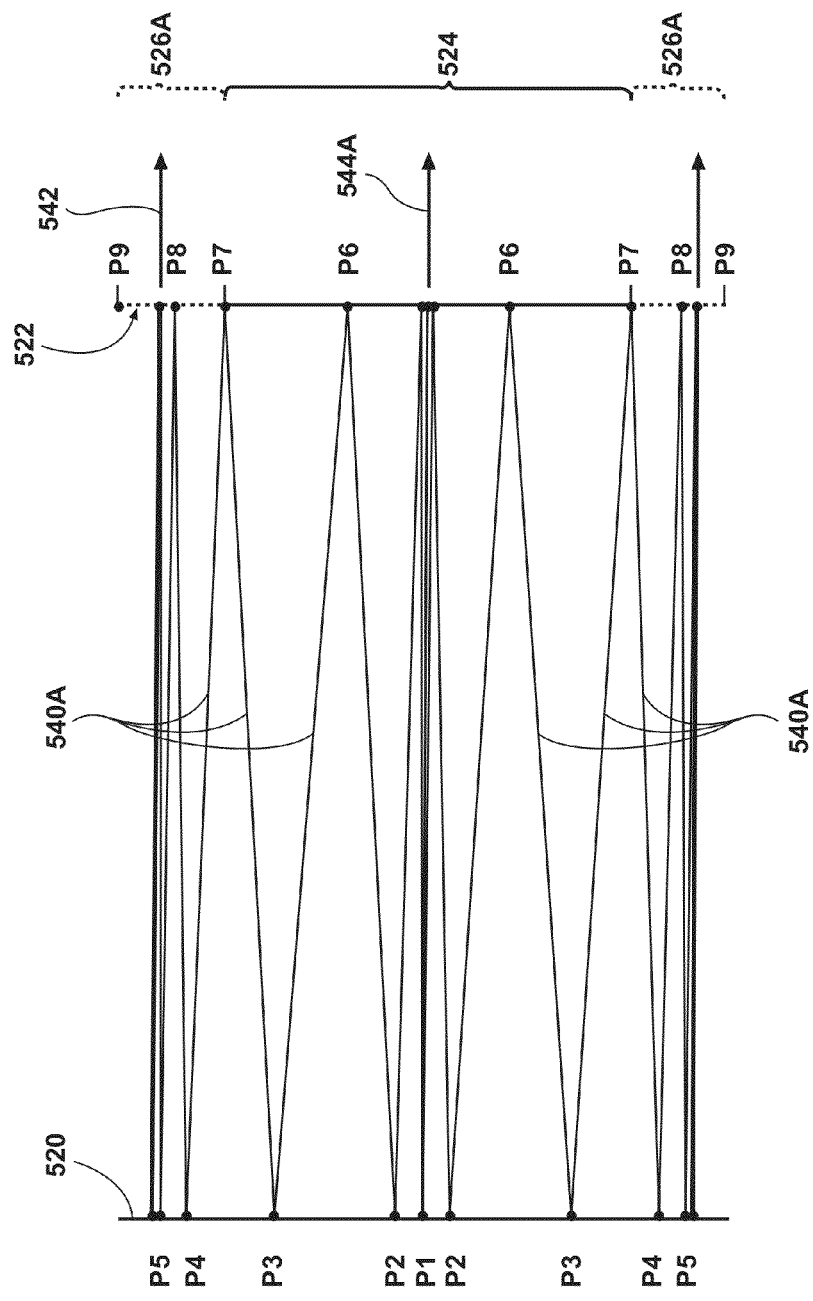
FIG. 12A is a schematic representation of a laser beam pattern that can be generated by using the method described in FIG. 4 and then be modified to generated a single emission point.
Figure 12B:
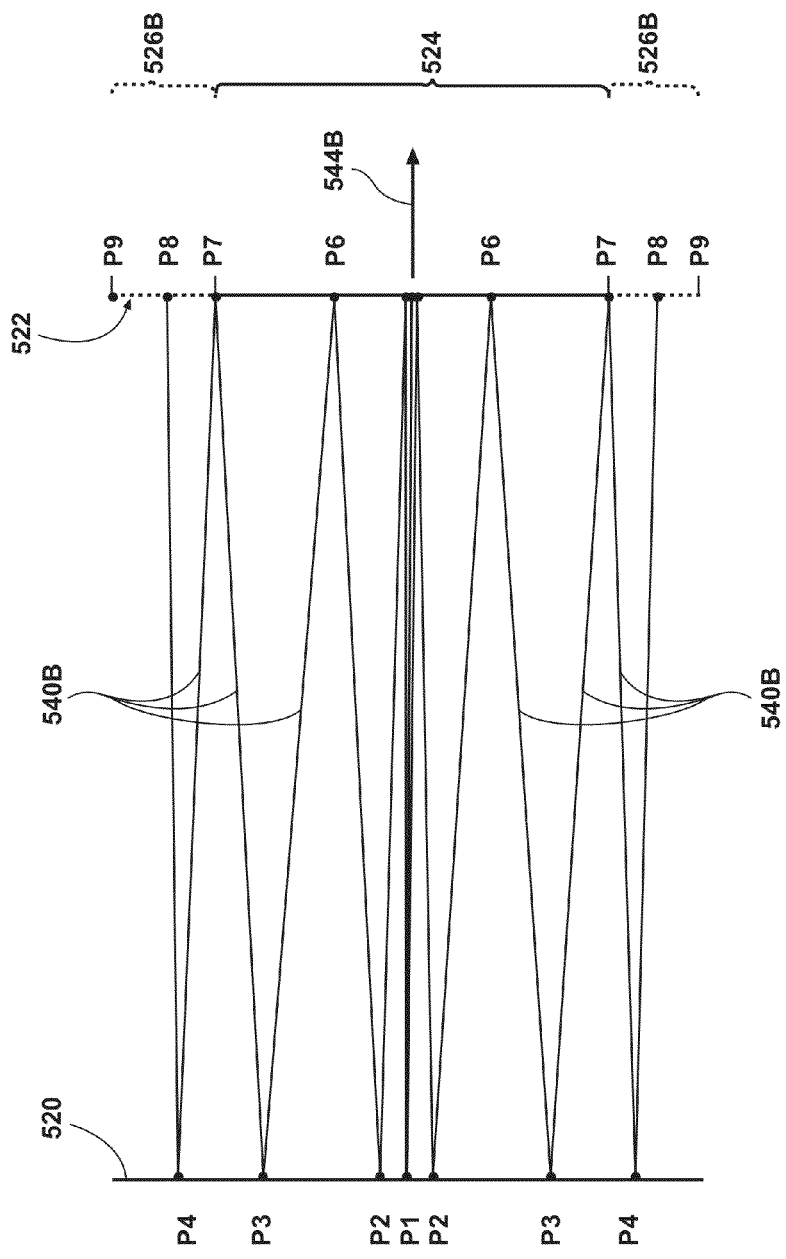
FIG. 12B is a schematic representation of a laser beam pattern with a single emission point by modifying the reflector design of FIG. 12A.

Referring now to FIGS. 12A and 12B, the concept of single point emission is described in greater detail. Using the method of determining a surface topology of a reflector surface 200, as described above, total reflectance reflector 520 and partial reflectance reflector 522 can be designed to produce a beam pattern with a center emission 544A and edge emissions 542 through the partial reflectance reflector 522. Such an emission pattern is generated via multiple reflections within the cavity depicted as 540A at multiple points P1-P9 on the total reflectance reflector 520 and partial reflectance reflector 522.

The partial reflectance reflector 522 as defined by surface topology determined from method 200 can further be partitioned into a first section 524 and a second section 526A. In the first section 522 does not have the undesired edge emissions 542 emitted therethrough and the second section 526A does have the undesired edge emissions 542 emitted therethrough. As a next step, the slope in the second section 526A is modified in a manner such that any beam incident upon it will be reflected back from a 90° incident surface so that the beam is reflected back to its origination point. By doing so, the second section 526A is modified to second section 526B (FIG. 12B) where there is no emission through the second section 526B. Furthermore the reflected rays are modified to 540B, different from 540A, and all of the radiation reflected from the second section is ultimately emitted as part of center emission 544B, which differs, at least in intensity from center emission 544A.

Figure 13:
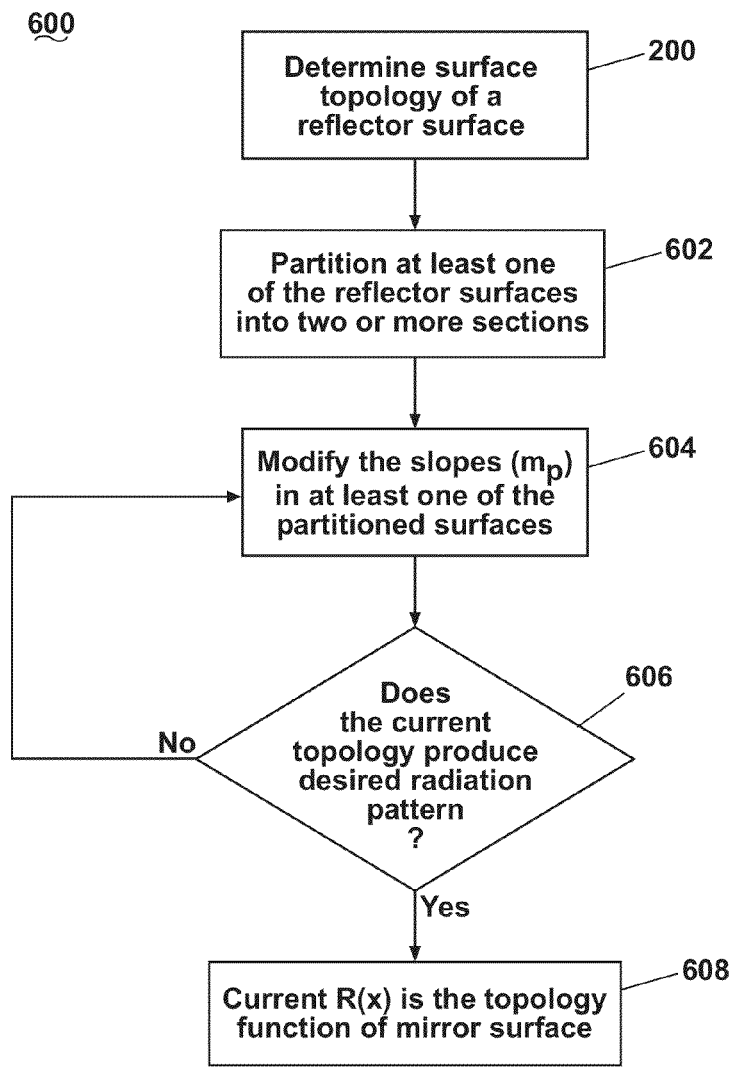
FIG. 13 is a flow diagram illustrating a method of modifying a convergent reflector design to achieve a modified emission pattern.

The method 600 of generating a single convergent emission point is shown in FIG. 13. Initially, a convergent surface topology of the reflector surface must be determined using method 200. Next the reflector surface must be divided into two or more sections at 602. The sections must be non-overlapping and one section must contain the point from where emission is desired and another section must contain the point or region from where emission is not desired. Next, the slopes at the surface of at least one of the portioned sections are modified at 604. The slopes at the surface of the modified section are set such that any light incident upon that surface will be reflected back to the source of the incident light. The modified topology with the modified section is then tested or simulated at 606 to determine if it produces the desired radiation pattern with a single convergence point. If it does not, the slopes in the modified section are further modified, so that incident light on any surface in that section is sufficiently reflected back to the origin of the light. If however it is determined that that the desired radiation pattern is achieved at 606, then the final topology of the reflectors are known at 608.

While the invention has been specifically described in connection with certain specific embodiments thereof, it is to be understood that this is by way of illustration and not of limitation. Reasonable variation and modification is possible within the scope of the forgoing disclosure and drawings without departing from the spirit of the invention which is defined in the appended claims.

What is claimed is:

1. A method of generating a convergent surface topology of two reflectors comprising the steps of:
    A. generating a convergence pattern of a forcing function in a complex space having at least two unsolvable areas by root approximation methods;
    B. determining a boundary edge of each of the unsolvable areas;
    C. selecting a starting point of one of the boundary edges of the unsolvable areas;
    D. iterating a convergence algorithm beginning with the starting point to create a stepping pattern in the complex space in the at least one unsolvable area;
    E. converting the stepping pattern into the real domain to form a topology pattern comprising a first and second set of coordinates of the surface topology;
    F. determining a first set of slopes corresponding to each of the first set of coordinates of the surface topology;
    G. fitting the slopes to a current iteration of a second set of coordinates corresponding to the first set of coordinates to generate at least one slope function;
    H. integrating the at least one slope function relative to the current iteration of the second set of coordinates to determine a reflector topology function;
    I. recording the current iteration of the second set of coordinates as a previous iteration of the second set of coordinates;
    J. determining a new iteration of the second set of coordinates corresponding to the first set of coordinates from the mirror topology function and setting the new iteration of the second set of coordinates to the current iteration of the of the second set of coordinates;
    K. determining that the reflector topology function represents the surface topology of the reflector when comparing the new iteration of the second set of coordinates to the previous iteration of the second set of coordinates satisfies a threshold; and
    L. repeating steps F-K if comparing the current iteration of the second set of coordinates to the previous iteration of the second set of coordinates does not satisfy a threshold.

2. The method of claim 1 further comprising the steps of: repeatedly iterating the reflector topology function while the comparison of the current iteration of the second set of coordinates to the previous iteration of the second set of coordinates does not satisfy a threshold, wherein the previous iteration of a second set of coordinates is set to the new iteration of the second set of coordinates from the previous iteration.

3. The method of claim 1 wherein the forcing function is determined by the steps of:
    A. selecting a mathematical function;
    B. determining if the mathematical function has any areas of non-convergence when applied to a convergence algorithm;
    C. if the mathematical function has areas of non-convergence, then determining the forcing function to be equal to the mathematical function;
    D. if the mathematical function does not have areas of non-convergence, then perturbing the mathematical function and repeating steps B and C.

4. The method of claim 3 wherein the mathematical function has the form of:

$$f(x) = \sum_{q}^{Q} K_q * x^q \Big|_{Q \geq 3}$$

where q and Q are integers and $K_q$ are real numbers.

5. The method of claim 4 wherein the perturbing the mathematical function comprises incrementing the value of $K_q$ by a predetermined perturbation amount.

6. The method of claim 5 wherein the predetermined perturbation amount is 0.1.

7. The method of claim 1 wherein the forcing function is:

$f(x) = -x^4 + 4.29x^2 + 5.62$.

8. The method of claim 1 wherein the convergence algorithm is a Newton-Raphson algorithm.

9. The method of claim 1 wherein the first set of coordinates is a y-coordinate in a Cartesian coordinate system.

10. The method of claim 1 wherein the second set of coordinates is an x-coordinate in a Cartesian coordinate system.

11. The method of claim 1 wherein determining the current iteration of the second set of coordinates to the previous iteration of the second set of coordinates satisfies a threshold when the sum of the difference between each of the values of the current iteration of the second set of coordinates and the previous iteration of the second set of coordinates is below a predetermined threshold value.

12. The method of claim 1 wherein determining the current iteration of the second set of coordinates to the previous iteration of the second set of coordinates satisfies a threshold when the sum of the square root of the square of the difference between each of the values of the current iteration of the second set of coordinates and the previous iteration of the second set of coordinates is below a predetermined threshold value.

13. The method of claim 1 wherein determining the current iteration of the second set of coordinates to the previous iteration of the second set of coordinates satisfies a threshold when the sum of the square root of the square of the difference between each of the values of the current iteration of the second set of coordinates and the previous iteration of the second set of coordinates all divided by the product of a number of members in the second set of coordinates and the average of the members in the second set of coordinates is below a predetermined threshold value.

14. The method of claim 13 wherein predetermined threshold value is 0.1% or less.

15. The method of claim 1 further comprising the steps of:
    partitioning the reflector surface in to at least two sections of the reflector; and
    modifying the surface topology of one of the at least two sections of the reflector, wherein the section with modified surface topology does not emit radiation therethrough.

16. The method claim 15 wherein modifying the surface topology of one of the at least one section comprises modifying the slope of the surface of the section such that any radiation incident upon that surface is reflected back such that the radiation is reflected by one or more reflections back to another of the at least two sections of the reflector.

17. The method of claim 15 wherein the section of the reflector to be modified has undesired radiation emission therethrough prior to modification and does not have radiation therethrough after modification.

18. A LASER device containing an optical cavity containing a gain medium with at least one reflector adjacent to the optical cavity, wherein the surface topology of the at least one reflector is defined by a reflector topology function determined by:

A. generating a convergence pattern of a forcing function in a complex space having at least two unsolvable areas by root approximation methods;

B. determining a boundary edge of each of the unsolvable areas;

C. selecting a starting point of one of the boundary edges of the unsolvable areas;

D. iterating a convergence algorithm beginning with the starting point to create a stepping pattern in the complex space in the at least one unsolvable area;

E. converting the stepping pattern into the real domain to form a topology pattern comprising a first and second set of coordinates of the surface topology;

F. determining a first set of slopes corresponding to each of the first set of coordinates of the surface topology;

G. fitting the slopes to a current iteration of a second set of coordinates corresponding to the first set of coordinates to generate at least one slope function;

H. integrating the at least one slope function relative to the current iteration of the second set of coordinates to determine a reflector topology function;

I. recording the current iteration of the second set of coordinates as a previous iteration of the second set of coordinates;

J. determining a new iteration of the second set of coordinates corresponding to the first set of coordinates from the mirror topology function and setting the new iteration of the second set of coordinates to the current iteration of the of the second set of coordinates;

K. determining that the reflector topology function represents the surface topology of the reflector when comparing the new iteration of the second set of coordinates to the previous iteration of the second set of coordinates satisfies a threshold; and L. repeating steps F-K if comparing the current iteration of the second set of coordinates to the previous iteration of the second set of coordinates does not satisfy a threshold.

* * * * *